United States Patent
Xu

(10) Patent No.: US 8,520,734 B1
(45) Date of Patent: Aug. 27, 2013

(54) METHOD AND SYSTEM FOR REMOTELY COMMUNICATING A COMPUTER RENDERED IMAGE SEQUENCE

(75) Inventor: Zhan Xu, Richmond (CA)

(73) Assignee: Teradici Corporation, Burnaby, British Columbia (CA)

( * ) Notice: Subject to any disclaimer, the term of this patent is extended or adjusted under 35 U.S.C. 154(b) by 720 days.

(21) Appl. No.: 12/462,235

(22) Filed: Jul. 31, 2009

(51) Int. Cl.
*H04N 7/12* (2006.01)

(52) U.S. Cl.
USPC ............... 375/240.16; 375/240.1; 375/240.02

(58) Field of Classification Search
USPC .......................... 375/240.16, 240.01, 240.02
See application file for complete search history.

(56) References Cited

U.S. PATENT DOCUMENTS

| | | | |
|---|---|---|---|
| 4,933,761 A | 6/1990 | Murakami et al. | |
| 5,873,830 A * | 2/1999 | Hossack et al. | 600/447 |
| 6,322,505 B1 * | 11/2001 | Hossack et al. | 600/437 |
| 7,747,086 B1 * | 6/2010 | Hobbs et al. | 382/232 |
| 7,822,278 B1 * | 10/2010 | Hobbs et al. | 382/232 |
| 2006/0039472 A1 * | 2/2006 | Barbarien et al. | 375/240.16 |
| 2008/0198270 A1 * | 8/2008 | Hobbs et al. | 348/708 |

OTHER PUBLICATIONS

U.S. Appl. No. 11/532,865, filed Sep. 18, 2006, entitled "Methods and Apparatus for Encoding a Digital Video Signal."
U.S. Appl. No. 11/537,545, filed Sep. 29, 2006, entitled "Progressive Block Encoding Using Region Analysis."
U.S. Appl. No. 11/880,992, filed Jul. 25, 2007, entitled "Method and Apparatus for Motion Vector Estimation for an Image Sequence."
U.S. Appl. No. 11/771,797, filed Jun. 29, 2007, entitled "Group Encoding of Wavelet Precision."
U.S. Appl. No. 12/011,631, filed Jan. 28, 2008, entitled "Apparatus and Methods for Image Decoding."
Kassim, A. A., et al., "Motion Compensated Lossy-to-Lossless Compression of 4-D Medical Images Using Integer Wavelet Transforms," IEEE Transactions on Information Technology in Biomedicine, vol. 9, No. 1, Mar. 2005, pp. 132-138.

* cited by examiner

*Primary Examiner* — Christopher S Kelley
*Assistant Examiner* — Maria Vazquez Colon
(74) *Attorney, Agent, or Firm* — Moser Taboada

(57) ABSTRACT

A method and system for communicating a computer rendered image sequence from a host computer to a remote computer. The method comprises determining, at the host computer, while performing a progressive encoding of an image portion of the computer rendered image sequence, motion of the image portion, wherein the progressive encoding comprises generating a lossy encoding of a frequency transform of the image portion and a first refinement encoding of the frequency transform; generating, at the host computer, a motion vector representing the motion; and communicating, from the host computer to the remote computer, the lossy encoding, the first refinement encoding, and the motion vector.

19 Claims, 9 Drawing Sheets

FIG. 5
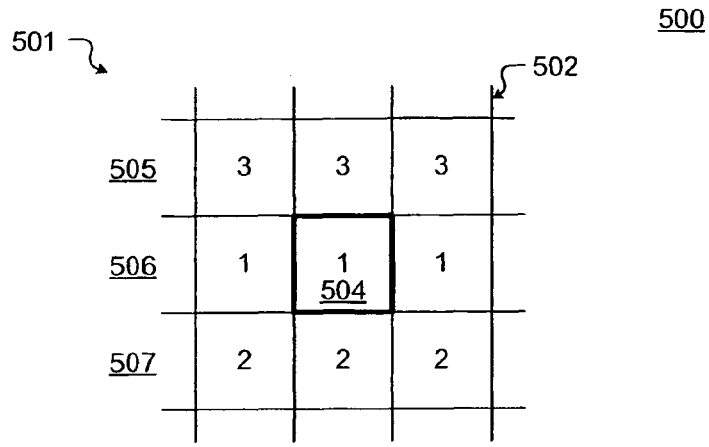
FIG. 5A
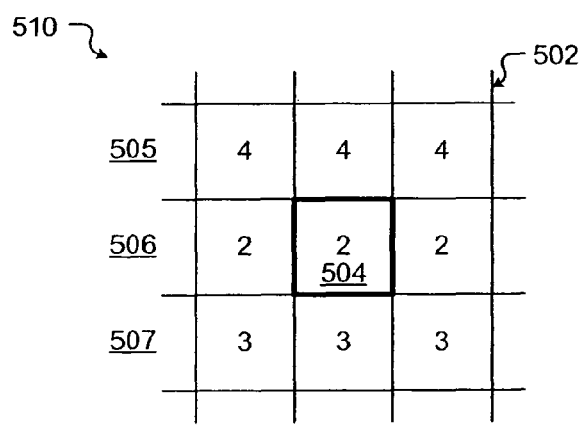
FIG. 5B
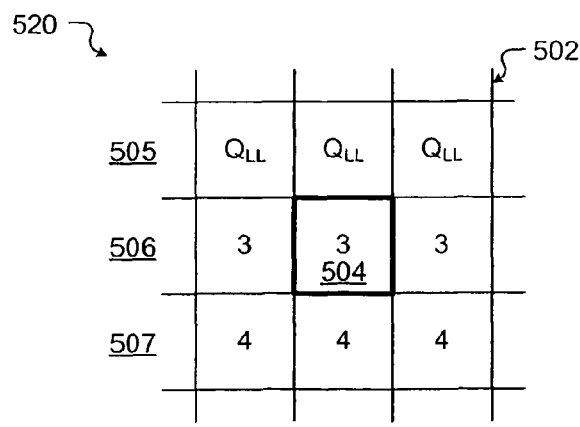
FIG. 5C

FIG. 5
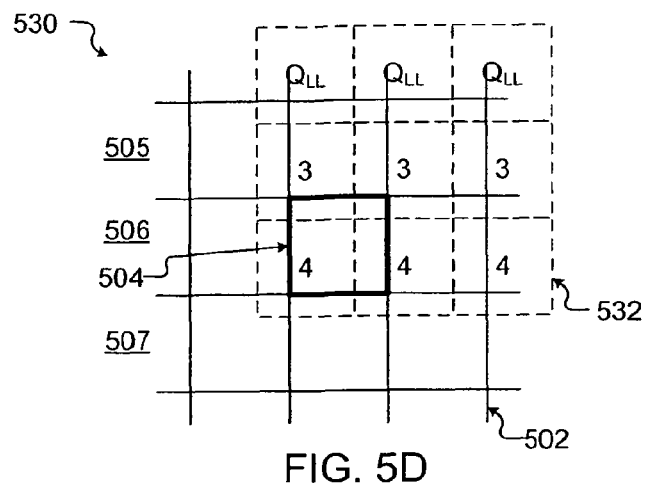
FIG. 5D
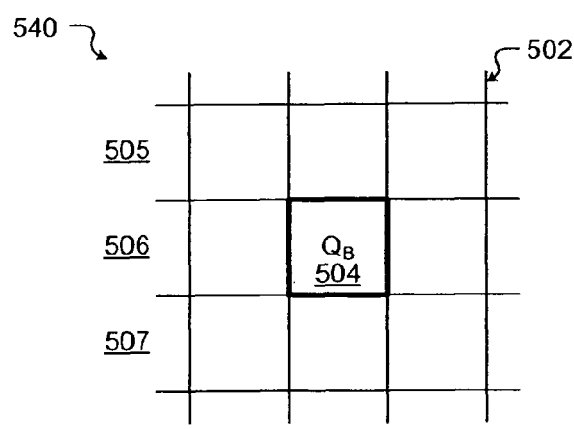
FIG. 5E
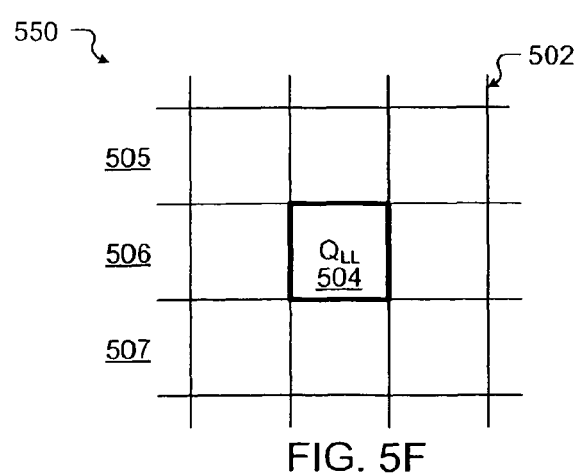
FIG. 5F

|     | 614 | 615 | 616 | 617 | 618 |
|-----|-----|-----|-----|-----|-----|
| 604 | $Q_b$ | $Q_b$ | $Q_b$ | $Q_b$ | $Q_b$ |
| 605 | $Q_b$ | $Q_b$ | $Q_b$ | $Q_b$ | $Q_b$ |
| 606 | $Q_b$ | $Q_b$ | $Q_b$ | $Q_b$ | $Q_a$ | ─ 622
| 607 | $Q_b$ | $Q_b$ | $Q_b$ | $Q_a$ | $Q_b$ |
| 608 | $Q_b$ | $Q_b$ | $Q_a$ | $Q_b$ | $Q_b$ | ─ 602

|     | 614 | 615 | 616 | 617 | 618 |
|-----|-----|-----|-----|-----|-----|
| 604 | $Q_b$ | $Q_b$ | $Q_b$ | $Q_b$ | $Q_b$ |
| 605 | $Q_b$ | $Q_b$ | $Q_b$ | $Q_b$ | $Q_b$ |
| 606 | $Q_b$ | $Q_b$ | $Q_b$ | $Q_b$ | $Q_a$ |
| 607 | $Q_b$ | $Q_b$ | $Q_b$ | $Q_a$ | $Q_b$ |
| 608 | $Q_b$ | $Q_b$ | $Q_a$ | $Q_b$ | $Q_b$ | ─ 602

|     | 714 | 715 | 716 | 717 | 718 |
|-----|-----|-----|-----|-----|-----|
| 704 | $Q_b$ | $Q_b$ | $Q_b$ | $Q_b$ | $Q_b$ |
| 705 | $Q_b$ | $Q_b$ | $Q_b$ | $Q_b$ | $Q_b$ |
| 706 | $Q_b$ | $Q_b$ | $Q_b$ | $Q_b$ | $Q_a$ |
| 707 | $Q_b$ | $Q_b$ | $Q_b$ | $Q_a$ | $Q_b$ |
| 708 | $Q_b$ | $Q_b$ | $Q_a$ | $Q_b$ | $Q_b$ |

FIG. 7B

|     | 714 | 715 | 716 | 717 | 718 |
|-----|-----|-----|-----|-----|-----|
|     | $Q_b$ | $Q_b$ | $Q_b$ | $Q_b$ | $Q_b$ |
| 704 | $Q_b$ | $Q_b$ | $Q_b$ | $Q_b$ | $Q_b$ |
| 705 | $Q_b$ | $Q_b$ | $Q_b$ | $Q_b$ | $Q_a$ |
| 706 | $Q_b$ | $Q_b$ | $Q_b$ | $Q_a$ | $Q_b$ |
| 707 | $Q_b$ | $Q_b$ | $Q_a$ | $Q_b$ | $Q_b$ |
| 708 |     |     |     |     |     |

|  | 914 | 915 | 916 | 917 | 918 |
|---|---|---|---|---|---|
| 904 | $Q_b$ | $Q_b$ | $Q_b$ | $Q_b$ | $Q_b$ |
| 905 | $Q_b$ | $Q_b$ | $Q_b$ | $Q_b$ | $Q_b$ |
| 906 | $Q_b$ | $Q_b$ | $Q_b$ | $Q_b$ | $Q_a$ — 922 |
| 907 | $Q_b$ | $Q_b$ | $Q_b$ | $Q_a$ | $Q_b$ |
| 908 | $Q_b$ | $Q_b$ | $Q_a$ | $Q_b$ | $Q_b$ — 902 |

|  | 914 | 915 | 916 | 917 | 918 |
|---|---|---|---|---|---|
| 904 | $Q_b$ | $Q_b$ | $Q_b$ | $Q_b$ | $Q_b$ |
| 905 | $Q_b$ | $Q_b$ | $Q_b$ | $Q_b$ | $Q_b$ |
| 906 | $Q_b$ | $Q_b$ | $Q_b$ | $Q_b$ | $Q_b$ — 924 |
| 907 | $Q_b$ | $Q_b$ | $Q_b$ | $Q_b$ | $Q_b$ |
| 908 | $Q_b$ | $Q_b$ | $Q_b$ | $Q_b$ | $Q_b$ — 902 |

914 915 916 917 918

METHOD AND SYSTEM FOR REMOTELY COMMUNICATING A COMPUTER RENDERED IMAGE SEQUENCE

CROSS-REFERENCE TO RELATED APPLICATIONS

This application contains subject matter related to each of the following patent applications: (1) co-pending U.S. patent application Ser. No. 11/532,865, filed Sep. 18, 2006, entitled "Methods and Apparatus for Encoding a Digital Video Signal"; (2) co-pending U.S. patent application Ser. No. 11/537,545, filed Sep. 29, 2006, entitled "Progressive Block Encoding Using Region Analysis"; (3) co-pending U.S. patent application Ser. No. 11/880,992, filed Jul. 25, 2007, entitled "Methods and Apparatus for Motion Vector Estimation for an Image Sequence"; (4) co-pending U.S. patent application Ser. No. 11/771,797, filed Jun. 29, 2007, entitled "Group Encoding of Wavelet Precision"; and (5) co-pending U.S. patent application Ser. No. 12/011,631, filed Jan. 28, 2008, entitled "Apparatus and Methods for Progressive Image Decoding". Each of these patent applications is hereby incorporated herein by reference in their entirety.

BACKGROUND OF THE INVENTION

1. Field of the Invention

Embodiments of the present invention relate generally to a system and method for encoding a computer rendered image sequence for communication across a network to a remote display. Specifically, progressive refinement techniques are utilized to refine visually persistent static image portions of the computer rendered image sequence. When a visually persistent image portion undergoes motion (e.g., scrolling of an image) before image refinement is complete, lossless motion vectors convey the movement of the partially refined image portions. Once motion stops, image portions are reconstructed using quality attributes of the partially refined image portions prior to the motion.

2. Description of the Related Art

Progressive Image Transmission (PIT) methods are currently used for the communication of large media data sets, such as photographs or video, over limited bandwidth communication channels. Related image refinement techniques, such as Advanced Video Coding (AVC) extensions to standards like H.264/MPEG or Fine Grain Scalability (FGS) methods, provide sub-stream information which enables increased quality of reconstructed remote images if sufficient bandwidth is available.

While PIT methods are aimed at intra-frame compression, motion compensation methods known to the art take advantage of inter-frame attributes of an image stream to increase compression. For example, block motion compensation is a technique in which blocks in a partitioned frame are predicted from blocks of equal size in a reference frame. The blocks are not transformed in any way apart from being represented by a motion vector describing the shifted position of the predicted block. In Motion Photographic Experts Group (MPEG), blocks within frames are predicted using motion compensation, and error (residual) data is then compressed using transform encoding and transmitted. In regard to remote computing applications, some remote display technologies, such as the Stateless Low-Level Interface Machine (SLIM), use vectors in the form of copy commands to copy select areas of a remote display image from one region of the remote display to another rather than re-communicating the relocated image data. Such methods require large amounts of network bandwidth to communicate the original image content to the remote display before such copy commands can be invoked, adding latency to a user's interactive experience at a remote display when the original image is subjected to motion.

Therefore, there is a need in the art for efficiently communicating a dynamic computer display image representation from a host computer to a remote computer display.

SUMMARY OF THE INVENTION

Embodiments of the present invention generally relate to a method and system for communicating a computer rendered image sequence from a host computer to a remote computer. The method comprises determining, at the host computer, while performing a progressive encoding of an image portion of the computer rendered image sequence, motion of the image portion, wherein the progressive encoding comprises generating a lossy encoding of a frequency transform of the image portion and a first refinement encoding of the frequency transform; generating, at the host computer, a motion vector representing the motion; and communicating, from the host computer to the remote computer, the lossy encoding, the first refinement encoding, and the motion vector.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 is a diagram showing a representative section of an image frame transitioning between progressive refinement and motion states;

FIG. 6 illustrates an identified image section before and after motion that inherits an initial quality following the motion from the representative quality of a defined region before the motion;

FIG. 7 illustrates an image area before and after motion in which identified sections are re-encoded at a higher priority following motion based on an analysis of the post-motion quality of the image area;

FIG. 9 illustrates a series of frame updates for a representative image section through a transition between progressive refinement and motion states in which at least one section comprises a progressive refinement prior to motion compensation.

DETAILED DESCRIPTION

The invention may be implemented in numerous ways, including as a process, an article of manufacture, an apparatus, a system, and as a set of computer-readable descriptions and/or instructions embedded on and/or in a computer-readable medium such as a computer-readable storage medium. In this specification, these implementations, or any other form that the invention may take, may be referred to as techniques. The Detailed Description provides an exposition of one or more embodiments of the invention that enable improvements in features such as performance, power utilization, cost, scalability, efficiency, and utility of use in the field identified above. The Detailed Description includes an Introduction to facilitate the more rapid understanding of the remainder of the Detailed Description. Additionally, the invention encompasses all possible modifications and variations within the scope of the issued claims.

The term processor as used herein refers to any type of processor, CPU, microprocessor, microcontroller, embedded processor, media processor, graphics processor, or any other programmable device capable of executing and/or interpreting instructions in a form of software (such as microcode, firmware and/or programs).

The term software as used herein refers to any type of computer-executable instructions for any type of processor, such as programs, applications, scripts, drivers, operating systems, firmware, and microcode. Computer-executable instructions include any types of instructions performed by a processor, such as binary instructions that are directly performed, instructions that are translated and/or decoded prior to being performed, and instructions that are interpreted.

The term motion vector as used herein refers to a vector associated with a defined section of a source image (such as a defined block of a current image frame) identifying an exact pixel match between image content of the defined section of the source image and image content of an offset area of a reference image, usually from a previous image frame.

The term lossless motion compensation as used herein refers to a form of block motion compensation wherein image content (i.e., pixel values) of a lossless reference image region at the remote system are copied to a section of the display image as specified by a motion vector.

A partially refined image as defined herein comprises one or more adjacent image sections wherein a progressive encoding sequence for at least one of the image sections has not yet completed.

The term lossy motion compensation as used herein refers to a form of block motion compensation wherein pixels of a partially refined (i.e., lossy) reference image region at the remote system are copied to a section of the display image as specified by a motion vector. Consequently, the derived remote display image is a lossy representation of the source image.

Figure 1:
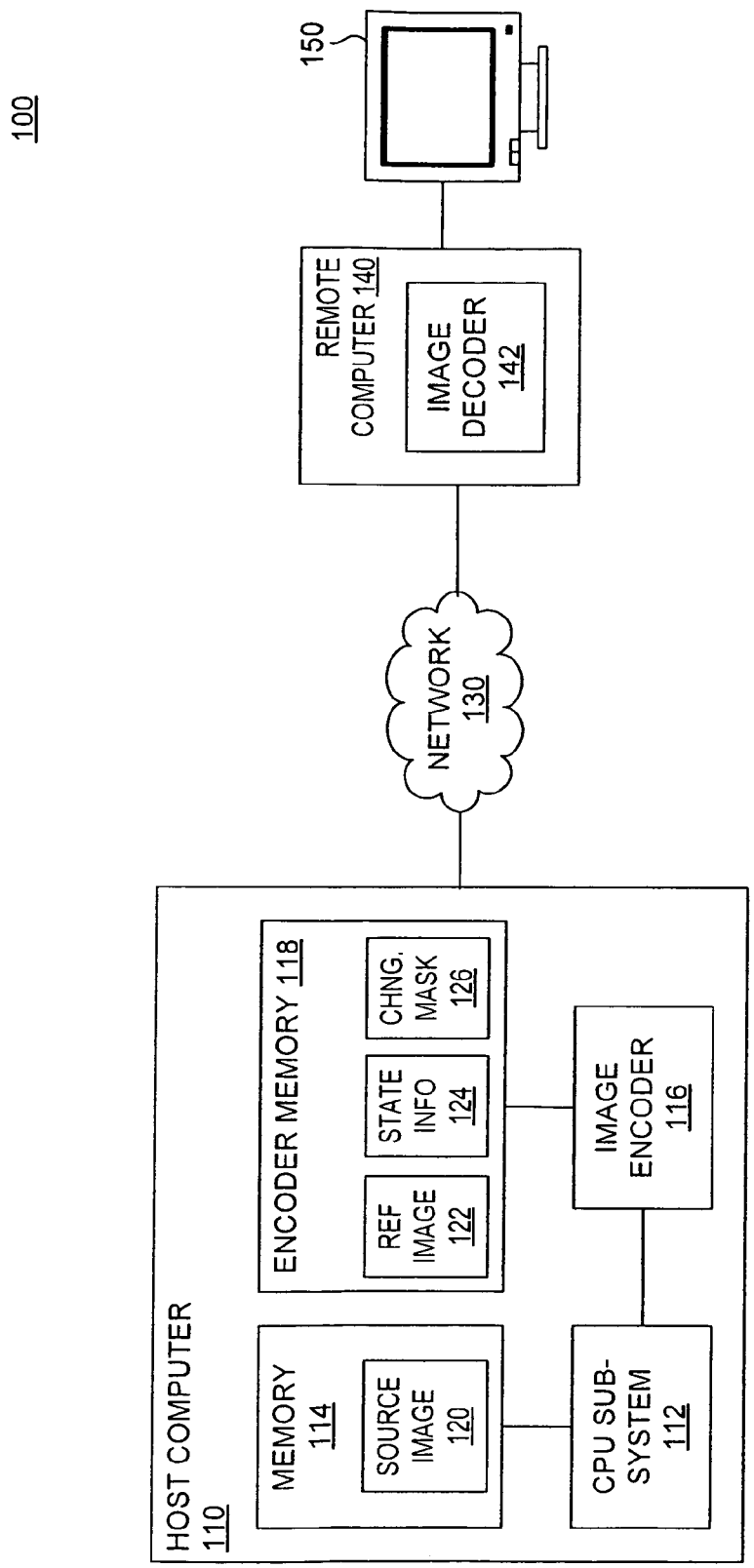
FIG. 1 is an illustration of a host computer comprising an image encoder connected by a network to remote computer comprising an image decoder.

FIG. 1 shows a computing system 100 comprising a host computer 110, including image encoder 116, coupled to a remote computer 140, comprising image decoder 142, via a network 130. If an image section of a source image 120 is visually persistent (i.e., each pixel of a source image section matches with the pixels of the same section in the previous frame), a progressive refinement sequence is initiated, refinement information is compressed using transform domain methods (e.g., frequency transforms such as discrete cosine transform, wavelet transform, and the like), and the compressed refinement information is communicated to the remote computer. The current refinement state is stored in encoder-accessible memory 118 as state information 124.

The progressive refinement sequence continues over a number of source image frame update cycles until a lossless representation of the source image has been communicated to the remote computer, or the source image changes, or a motion vector is established to represent motion of the persistent section of the source image. Motion search techniques are utilized at the host computer 110 to determine if sections of a source image 120 can be represented by motion vectors (e.g., by finding a matching area of pixels in a previous reference image 122). If motion is detected, one or more motion vectors are communicated identifying reference image pixels of the already partially refined remote reference image for use as the remote display output image, thereby using less network bandwidth and providing higher quality of the output image under motion than re-initiating progressive refinement each time a motion vector is determined. If motion ends, a new progressive refinement sequence is initiated, this time using inherited quality attributes of source image areas before the motion to determine the initial refinement level.

FIG. 1 illustrates selected details of an embodiment of a computing system 100 ("system 100") enabled to encode, transmit, decode, and display one or more source images 120, using image encoding and image decoding techniques. The host computer 110 is, generally, a computer or system of computers that has been designated for running user software applications and providing computing services on the network 130. For example, in an exemplary case, the host computer 110, through the network 130, supplies the remote computer 140 with a Graphical User Interface (GUI) for application software resident on host computer 110. According to various embodiments, the one or more source images 120 are one or more of: a series of still images, such as photographic images; synthetic images; a stream of images, such as a raster representation of a video stream such as a movie; video or composite images, such as a stream of frame updates of a dynamic computer display image representation (e.g., a computer rendered image sequence comprising a sequence of images in a format, such as a raster format or pixel map, for display by a computer display) optionally and/or selectively including photographs and/or video and/or text overlay; scrolling images, such as in a graphical word processing environment; other changing display information; a region and/or a layer of any of the foregoing; and any combination of the foregoing rendered by application software of host computer 110, retrieved from storage, or received over a network connection. In further embodiments, the encoding and the decoding use progressive encoding/decoding techniques in conjunction with block motion compensation of partially refined (lossy) and/or lossless image sections.

Each source image frame comprises one or more layers of image types, including background, text, picture, video, or object layers, based on one or more spatial and/or temporal features, such as region (location in the particular image), contrast, color, content, and other suitable parameters. The layers, such as the picture layers or the video layers, are independently processed using progressive encoding/decoding techniques. The progressive encoding/decoding techniques enable display of a less accurate (i.e., partially refined) version of each respective one of the layers prior to all of the respective layers being received. Accordingly, the display system is quickly responsive to changes in image content, even under constrained transmission (e.g., network) bandwidth. In various embodiments, high-detail aspects of an image or areas outside a region of interest of the image are transmitted at a lower priority and/or subject to transmission bandwidth constraints. In some embodiments, a source image 120 is decomposed into different layers based on pixel update status, and the image is progressively encoded and/or encoded using lossy and/or lossless motion compensation. In further embodiments, a pixel that has been processed, for example encoded and transmitted, is covered by an 'already lossless' mask until it changes value to prevent retransmission of redundant information.

In some embodiments, source image 120 is partitioned into one or more regions and/or layers of different image types, such as background, text, and picture image types. One or more image types (e.g., the picture image type) are marked for encoding using the progressive encoding and/or motion compensation techniques described herein.

In an exemplary case, source image 120 is partitioned as a grid of blocks (hereinafter referenced as image "sections"), each section comprising a set of pixels (e.g., 4×4 pixel blocks, 8×8 pixel blocks, or the like), where an image portion is comprised of at least one image section and, generally, comprises many image sections. In various embodiments, multiple sections are aggregated to form macro-blocks. For example, source image 120 may be processed as a grid of macro-blocks of 16×16 pixels, each macro-block comprising 4 sections of 8×8 pixels. Generally, transform domain encoding operations, such as discrete cosine encoding or wavelet encoding using progressive refinement, are executed on macro-block entities, whereas motion compensation is executed at block-level resolution. In other embodiments, image sections are defined at a macro-block level, or by pixel blocks of alternative dimensions or alternative shapes, or defined by image characteristics.

Figure 2:
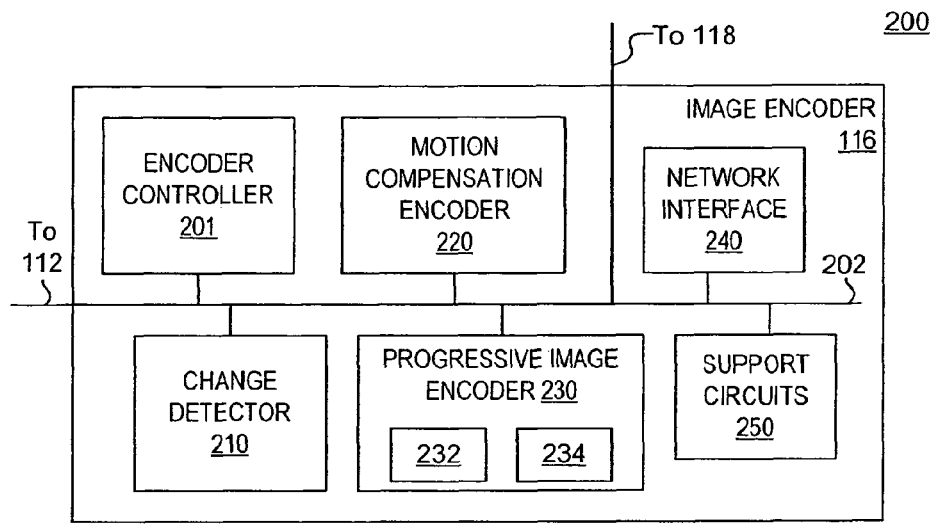
FIG. 2 is an illustration of select details of an image encoder.

According to various embodiments, host computer 110 is one or more of: a client blade PC architecture; a computer server architecture; and any computer system or processor capable of performing image encoding techniques, where the host computer 110 becomes a special-purpose computer when executing specific instructions for implementing the methods described herein. The exemplary embodiment of host computer 110, as illustrated in FIGS. 1-2, is one of many possible embodiments. Various embodiments are contemplated, including various types of computer systems, processors, storage systems, and/or other hardware devices, along with programming and/or processing environments, providing progressive image and/or video encoding capabilities. While the image encoder 116 of computer 110 is depicted and described as a processing module coupled to CPU sub-system 112 by one or more suitable interconnects, such as one or more image buses (e.g. Digital Visual Interface (DVI) or DISPLAYPORT) and/or peripheral interconnects (e.g., PCI-EXPRESS), alternative embodiments of system 100 comprise an image encoder 116 implemented, at least in part, as machine executable instructions stored in a memory 114 of the host computer 110 and executed by a processor of a CPU sub-system 112 of the host computer 110, causing the host computer 110 to become a special-purpose computer.

In an embodiment, CPU sub-system 112 comprises Central Processing Unit (CPU), chipset, and Graphics Processing Unit (GPU) components for providing a source of images, such as source image 120, to image encoder 116. According to various embodiments, an image source comprising CPU sub-system and memory elements coupled to an image encoder is described in commonly assigned U.S. patent application Ser. No. 12/011,631 which is incorporated herein by reference in its entirety.

In some embodiments, memory 114 stores software and/or data used by processor and/or GPU resources of CPU sub-system 112, and/or by other components of host computer 110. In various embodiments, memory 114 is globally distributed, such as by including system memory of a plurality of computer systems. In some such embodiments, memory 114 comprises drawing memory partitioned into a plurality of partitions, such as vertex and frame buffer partitions, and the frame buffer partition is accessible by image encoder 116. According to various embodiments, memory 114 includes one or more of: electronic, magnetic, optical, and/or other types of storage media; volatile computer-readable media, such as random access memory (RAM), dynamic random access memory (DRAM), and static random access memory (SRAM); and nonvolatile computer-readable media, such as Read-Only Memory (ROM), hard drive, tape, CDROM, DVDROM, magneto-optical disks, Erasable Programmable Read-Only Memory (EPROM), Electrically Erasable Programmable Read-Only Memory (EEPROM), Flash EPROM, and the like.

Host computer 110 is enabled to perform image encoding, such as progressive image encoding and lossless motion compensation. According to various embodiments, the progressive image encoding includes a frequency transform based encoding such as one or more of: Discrete Cosine Transform (DCT) encoding; wavelet encoding; Group Encoding of Wavelet Precision (GrEWP) encoding as described in commonly assigned U.S. patent application Ser. No. 11/771,797 which is incorporated herein by reference in its entirety; motion estimation as described in commonly assigned U.S. patent application Ser. No. 11/880,992 which is incorporated herein by reference in its entirety; and other image encoding techniques. In an embodiment, image encoder 116 performs image encoding operations, such as one or more of image type decomposition, transforming, progressive quantization, image difference calculations for residual encoding, lossy motion compensation, lossless motion compensation and entropy encoding. According to various embodiments, image encoder 116 includes one or more of: a programmable embedded digital media processor, such as a TMS320DM64x DaVinci™ digital media processor available from Texas Instruments; a PNX1300 Nexperia™ processor from NXP Semiconductors; a Field Programmable Gate Array (FPGA) or an Application Specific Integrated Circuit (ASIC) configured, at least in part, as a logic circuit to perform image encoding; other processors and/or electronic hardware suitable for performing image encoding; and any combination of the foregoing. An embodiment of image encoder 116 is described below with reference to FIG. 2.

In various embodiments encoder memory 118 comprises a memory such as Dynamic Random Access Memory (DRAM), SDRAM, extreme data rate (XDR) RAM, Double Data Rate (DDR) RAM or video DRAM directly coupled to image encoder 116. In other embodiments, part or all of encoder memory 118 comprises one or more partitions of memory 114 attached to CPU sub-system 112; e.g., a single memory is used for both general computing and encoding. Encoder memory 118 generally stores image information related to the encoding process (i.e., encoder memory 118 provides storage means for storing encoding information), such as encoder directives (e.g. performance tuning parameters such as network or image parameters), reference image pixel data, image type information, image refinement state information (i.e., progressive build state), image mask information (e.g., information that specifies unchanged image regions associated with a previous image transmission), and/or data related to motion compensation (e.g., motion status information and motion vectors). In some embodiments, encoder memory 118 stores data related to source image 120, such as a local copy of sections of pixel data and/or a list of Cyclic Redundancy Check (CRC) signatures associated with source image 120 used for motion search purposes.

In an embodiment, reference image 122 comprises pixel data associated with the previous frame of source image 120, stored, for example, in Red Green Blue (RGB) or chrominance-luminance (YUV) format. In some embodiments, select sections, such as unchanged visually persistent sections of the reference image 122, are stored as transform domain coefficients, enabling image refinement (i.e., communication of the next quality increment) without a need to transform the source image 120. In other embodiments, for example in the interest of memory efficiency, visually persistent sections of the source image 120 undergo transformation preceding each refinement step, and image refinement state information (e.g., state information 124) from the previous encoding cycle is used to determine the baseline for the next quality refinement increment.

State information 124 comprises status flags and refinement state information associated with sections of source image 120 and reference image 122. In an embodiment commensurate with encoding process 400 depicted in FIG. 4, state information 124 comprises at least the status indicia of Table 1 for each image section.

TABLE 1

Encoding Status Indicia

| Indicator | Description |
| --- | --- |
| MOTION_VALID | Binary flag to indicate that a section comprises a motion vector that references a matched area of the reference image. |
| LOSSY | Binary flag to indicate that a section is either partially refined if progressive encoding is incomplete or lossless if progressive encoding is complete. |
| PAUSE_DURATION | Integer value defining the number of consecutive frames of a pause in motion in which the section is visually persistent. Used in the context of a delay filter to specify an end to the motion. |
| REFINEMENT LEVEL | Integer value defining previously communicated refinement level for section (e.g., one of 16 values in a progressive encoding system of 16 quality levels.) |

In some embodiments, Table 1 further comprises a 'CHANGE' indicator associated with each section or macro-block. Such a binary flag indicates if pixels in a section have changed (either as a result of motion or new image pixels) or are unchanged since the previous encoding iteration (i.e., visually persistent pixels are unchanged). In other embodiments, memory 118 stores change mask 126 comprising a set of 'CHANGE' indices associated with macro-blocks of source image 120. In select embodiments wherein progressive refinement is executed at a macro-block level (e.g., 16×16 pixels) and motion compensation is executed at a block/section level (e.g., 8×8 pixels), a pixel change related to any one block mandates re-encoding of the entire macro-block; therefore, change mask 126 need only be maintained at the macro-block level. In some embodiments, encoder memory 118 stores state information 124 comprising related motion vector and refinement state information for one or more image sections to support concurrent execution of motion compensation encoding and progressive image encoding methods. Storage of related motion vector and refinement state information enables progressive encoding to continue from a previous quality level in the context (i.e., same section boundary definitions) of reference image 122 after a motion vector has been communicated. In a select case, encoder memory 118 maintains first and second quality state information for first and second spatial sections, respectively, of a frame buffer associated with the source image 120 (i.e., a rendered image sequence). The first spatial section comprises pixels of the image portion prior to the motion, the second spatial section comprises the pixels subsequent to the motion, and the second quality state information, subsequent to the motion, comprises a portion of the first quality state information prior to the motion. In a select case, subsequent to the motion, the second quality state information comprises transmitted encoded quality levels and an image source spatial location for the pixel prior to the motion.

In some embodiments, image encoder 116 is coupled to network 130 by some form of system communications interface which sends and receives electrical, electromagnetic, and/or optical signals that carry data, such as digital data streams, representing various types of information. In some embodiments, the system communications interface includes a network interface (e.g., network interface 240 described further below) that supports protocol stacks for network communications, such as Transmission Control Protocol/Internet Protocol (TCP/IP), and provides a connection to network 130. In other embodiments, such as a software embodiment of image encoder 116, a network interface of CPU sub-system 112 provides connectivity between host computer 110 and network 130.

Host computer 110 is coupled to network 130 which provides communications between various computer systems, including computer 110 and remote computer 140. According to various embodiments, network 130 includes one or more of: a wire-line network using Internet Protocol (IP) deployed as a local area network (LAN), such as may be used in a corporate environment; a wireless network; a Wide Area Network (WAN), such as may be used to connect an Internet Service Provider (ISP) to residential subscribers or corporate datacenter to remote offices; and any other type of network or combination of networks enabling communication between computer systems and/or other electronic devices.

Figure 3:
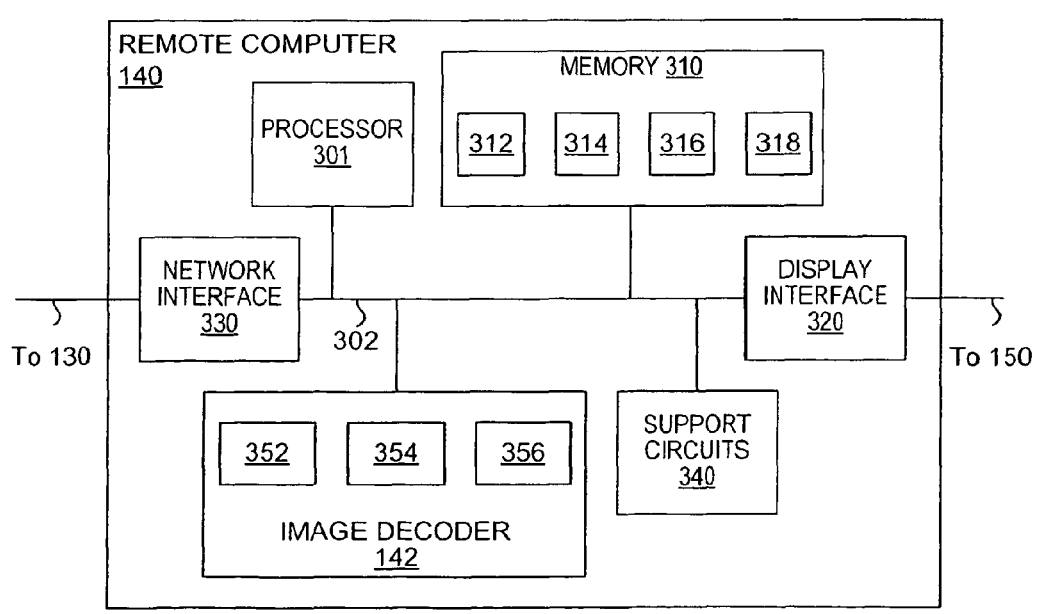
FIG. 3 is an illustration of select details of a remote computer.

Remote computer 140 is, generally, a computing device enabled to provide remote computing functions, such as presenting a desktop image for display, providing a network interface for connection to network 130, and optionally providing ports for connecting peripheral devices, where the remote computer 140 becomes a special-purpose computer when executing specific instructions for implementing the methods described herein. For example, in an embodiment, remote computer 140 is a terminal in a networked computer system (e.g., computing system 100). Such remote terminals include thin clients, personal computers, notebook computers, workstations, Personal Digital Assistants (PDAs), wireless devices, and the like. Remote computer 140 comprises image decoder 142 for decoding compressed display image data, including progressive image updates and lossless motion vectors received from host computer 110. An embodiment of remote computer 140 is depicted in FIG. 3.

Remote computer 140 is coupled to display 150 by a connection, such as one or more of: a Digital Visual Interface (DVI) connection; a Digital Packet Video Link (DPVL) connection; a Video Graphics Array (VGA) connection; a DISPLAYPORT connection; any other suitable display connection; and any combination of the foregoing. According to various embodiments, display 150 is one or more of: a Liquid Crystal Display (LCD) display; a Cathode Ray Tube (CRT) display; a plasma display; any other type of display capable of displaying the one or more images; and any combination of the foregoing. For example, in some embodiments, display 130 is a Super eXtended Graphics Array (SXGA) display supporting a resolution of 1280×1024. In other embodiments, remote computer 140 connects to dual or quad display configurations. As other examples, display 150 supports one or more of the Video Graphics Array (VGA), High-Definition Television (HDTV), Ultra eXtended Graphics Array (UXGA), Quad eXtended Graphics Array (QXGA), Wide XGA (WXGA) and Wide QXGA (WQXGA) display standards.

FIG. 1 portrays only one variation of the myriad of possible network configurations. For example, system 100 may comprise more than one host computer 110 or more than one remote computer 140. For simplicity and clarity, only one host computer 110 and one remote computer 140 are depicted and described. In other embodiments, computer system 100 is communicatively coupled to a mass storage system, and encoded image information generated by the image encoding techniques is transmitted to storage of the mass storage system, such as by being sent to the mass storage system via network 130, or such as by being stored on mass storage directly coupled to host computer 110. In further embodiments, host computer 110 or another computer system, such as remote computer 140, retrieves the encoded image information from the mass storage system and performs the decoding. The techniques described herein are applicable in various embodiments, including those where progressive image decoding is performed.

As the various exemplary embodiments above illustrate, many configurations of computer system 100, CPU sub-system 112 and image encoder 116 are contemplated within the scope of the techniques described herein.

FIG. 2 is a diagram 200 that illustrates selected details of an embodiment of an image encoder 116 of FIG. 1, comprising encoder controller 201, change detector 210, motion compensation encoder 220, progressive image encoder 230, network interface 240, and support circuits 250 coupled by bus 202. Encoders 220 and 230 are generally enabled to communicate encoded image information, including refinement encodings and motion vectors, to image decoder 142 of remote computer 140 in FIG. 1, typically supported by underlying components such as network interface 240 and network 130 in FIG. 1. One of ordinary skill in the art should appreciate after learning the techniques related to the present invention contained in this application that part or all of the functions of network interface 240 may be incorporated in motion compensation encoder 220, progressive image encoder 230, and/or encoder controller 201.

According to various embodiments, image encoder 116 includes one or more of: a programmable embedded digital media processing core and associated memory structures, such as a TMS320DM64x DAVINCI digital media processor available from Texas Instruments; a PNX1300 NEXPERIA processor from NXP Semiconductors; a Field Programmable Gate Array (FPGA) or an Application Specific Integrated Circuit (ASIC) configured, at least in part, as a logic circuit to perform image encoding; other processors and/or electronic hardware suitable for performing image encoding; and any combination of the foregoing. In some embodiments, image encoder 116 is implemented at least in part as machine executable software by CPU sub-system 112 in FIG. 1. In some such embodiments, multiple instances of image encoder 116 are instantiated in different operating system environments or virtual machines associated with CPU subsystem 112, enabling simultaneous compression of the source images related to different operating system environments.

Encoder controller 201 is generally a controller, such as an embedded processing core (e.g., a microprocessor core from MIPS Technologies) or logic circuit, or controller software executed by CPU sub-system 112 configured to manage the various functions of image encoder 116. Such management functions include coordination of motion search and progressive encoding functions, maintenance of image state information 124 and/or reference image 122 in memory 118 of FIG. 1, and provision of Direct Memory Access (DMA) resources for accessing data structures in memory 114 (ref. FIG. 1). Such data structures include source image 120 (FIG. 1), a dirty mask associated with source image 120, drawing commands, hints, and/or software-derived motion vectors related to sections of source image 120.

In some embodiments, source image 120 is streamed to image encoder 116 over an image bus, such as a DVI interconnect, and change detector 210 performs an in-line comparison with reference image 122 or associated CRCs to determine image regions changed since a previous encoding cycle. An embodiment of such a change detection function is described in commonly assigned U.S. patent application Ser. No. 11/532,865, which is incorporated herein by reference in its entirety. In other embodiments, such as various embodiments in which image encoder 116 is coupled to CPU subsystem 112 by a PCI-EXPRESS interconnect, CPU sub-system 112 generates a descriptor list detailing which regions of source image 120 have changed. Changed regions are then copied to memory 118 under DMA control preceding encoding, as described for method 400 herein.

In various embodiments, motion compensation encoder 220 determines an exact pixel match between the section of the source image 120 being encoded and an area of reference image 122. Motion compensation encoder 220 then generates a lossless motion vector that specifies the location on the reference image 122 from which the section of source image 120 is derived. One method for generating a lossless motion vector based on CRC comparisons is described in commonly assigned U.S. patent application Ser. No. 11/880,992 which is incorporated by reference herein in its entirety. In other embodiments, lossless motion vectors are derived from drawing commands or instructions executed by CPU sub-system 112 in FIG. 1, in which case motion compensation encoder 220 typically comprises machine executable instructions stored in memory 114 of FIG. 1 and executed by CPU sub-system 112. Such instructions may include Graphics Device Interface (GDI)-based copy commands that are analyzed in conjunction with fill and redraw commands to determine the source and destination of pixel areas under motion.

Progressive image encoder 230 encodes partially refined (lossy) and/or lossless sections of source image 120 dependent on the state information for the section as described for method 400 herein. In an embodiment, progressive image encoder 230 comprises image transform, image scaling, image quantization, residual encoding, and entropy encoding functions operating under management of encoder controller 201. Progressive image encoder 230 is configured to generate a bit stream comprising initial encodings and incremental encoded refinement ranges for a visually persistent image or image section (i.e., image sections in which the pixel values remain constant and, in some instances, content from the image section is relocated to a new spatial location as specified by a motion vector), using a combination of transform coding methods (such as wavelet transform or Discrete Cosine Transform (DCT) transform); progressive encoding (such as GrEWP encoding as described in commonly assigned U.S. patent application Ser. No. 11/771,797, incorporated by reference herein in its entirety); progressive JPEG2000 encoding; and any similar progressive wavelet encoding technique and residual transform, for example to increases the quality of the previously refined image or image section to a numerically lossless level once the partially refined image representation has reached a perceptually lossless quality level. In various cases where progressive encoding state information (typically in the transform domain) has been discarded as a consequence of motion, and a section of the reference image 122 comprises partially refined pixel values, residual encoding following motion is accomplished in the spatial domain by comparing pixel values in the source image 120 to pixel values in the reference image 122 and communicating higher order bit values not yet transmitted. An embodiment of a progressive image encoder is described in commonly assigned U.S. patent application Ser. No. 11/537,545 which is incorporated herein by reference in its entirety.

In some embodiments, progressive image encoder 230 comprises an image decoder 232 and a difference encoder 234 that both operate to communicate encoded residual image information to the remote computer 140 following motion of a partially refined image section. The image decoder 232 generates a partially refined relocated set of pixels by decoding a combination of encoded frequency transform refinements (communicated before and/or during the motion) and motion vectors associated with the motion. The difference encoder 234 generates a set of encoded difference pixels by comparing the partially refined relocated set of pixels with a set of pixels in the source image 120 at the new location associated with the motion vectors. The progressive image encoder 230 communicates the encoded difference pixels to decoder 142 of the remote computer 140 where a residual update is performed.

Bus 202 is generally a communications infrastructure that provides communication between the various functions of image encoder 116, including communications with CPU sub-system 112, memory 114, and memory 118 in FIG. 1. Bus 202 is one or more of: a Peripheral Component Interconnect (PCI) bus; a PCI-Express™ bus; an Advanced Microprocessor Bus Architecture (AMBA®) bus; and any other connections, including wired, wireless, and optical connections, communications elements, controllers, data buffers and/or registers, drivers, repeaters, memory controllers, and receivers for coupling components of image encoder 116. According to various embodiments, bus 202 is one or more of: a single bus; a plurality of independent busses, with some of the components of computer 110 coupled to more than one of the independent busses; a plurality of bridged busses; a fabric; and any other one or more buses configured to couple the components of image encoder 116 to other components of computer 110.

Network interface 240 comprises physical layer elements, such as integrated Fast Ethernet or Gigabit Ethernet Physical Layer (PHY) transceivers or suitable PHY interface (e.g., Reduced Media Independent Interface (RMII) or Gigabit Media Independent Interface (GMII) interface) and higher layer protocol functions such as TCP/IP, User Datagram Protocol/Internet Protocol (UDP/IP), session management and security protocols associated with a packet network interface to network 130 (ref. FIG. 1). In some embodiments, image encoder 116 utilizes network interface resources of CPU sub-system 112 for the communication of compressed image data to the remote computer 140.

Support circuits 250 include at least one of power supplies, clock circuits, data registers, I/O interfaces, and the like. The support circuits 250 support the functionality of encoder controller 201, bus 202, change detector 210, motion compensation encoder 220, progressive image encoder 230, network interface 240, and other components of image encoder 116.

Many configurations of image encoder 116 are possible within the scope of the techniques described herein. For example, some or all of the functions are executed at least in part by encoder controller 201 according to some embodiments. In some embodiments, image encoder 116 further comprises image decomposition functions for decomposing source image 120 into different image types, such as background, text, picture, video or object layers based on spatial and temporal features, such as contrast, color content or other suitable parameters, including hints or drawing commands. In some such embodiments, image sections of background, text or video types are masked for encoding by optimized encoders known to the art (not illustrated in FIG. 2) while natural image types (e.g. pictures and suitable object types) are designated for processing by the encoding functions depicted in FIG. 2.

FIG. 3 is a diagram 300 that illustrates select details of an embodiment of a remote computer 140 in FIG. 1. In one or more embodiments, computer 140 comprises processor 301 with memory 310, display interface 320, network interface 330, support circuits 340, and image decoder 142 (ref. FIG. 1), communicatively coupled by bus 302. It will be appreciated by those of ordinary skill in the art that in an embodiment such as a thin client or desktop PC, computer 140 also comprises device interfaces such as Universal Serial Bus (USB) ports, mechanical housing components, connectors, power supplies, and the like not shown in FIG. 3. While in some embodiments computer 140 is implemented as a stand-alone system, such as a thin client or a desktop computer, in various other embodiments, computer 140 is a processing module integrated in an appliance, such as a desktop phone, a display or a wireless device. In such integrated embodiments, computer 140 is optionally configured to use resources, such as power supply and mechanical support components, provided by the appliance.

In some embodiments, computer 140 is implemented, at least in part, as a processor, a computer system, and/or a programming or a processing environment configured to receive and to decode display images (e.g., encoded display images received from host computer 110) such as: a sequence of encoded image frames, encoded image regions, or one or more progressively encoded image sequences and further implemented, at least in part as a processor, a computer system, and/or a programming or a processing environment configured to process various signals associated with one or more connected peripheral devices, including one or more of: Human Interface Devices (HIDs); peripheral components, such as microphones or speakers; other interfaces, such as a USB interface; and other components, interfaces, and/or connections associated with computer systems, desktop computers, and/or processors According to various embodiments, bus 302 is one or more of: a Peripheral Component Interconnect bus; a PCI-Express™ bus; an Advanced Microprocessor Bus Architecture (AMBA®) bus; and any other connections, including wired, wireless, and optical connections, communications elements, controllers, data buffers and/or registers, drivers, repeaters, and receivers for coupling components of computer 140. According to various embodiments, bus 302 is one or more of: a single bus; a plurality of independent busses, with some of the components of computer 140 coupled to more than one of the independent busses; a plurality of bridged busses; a fabric and any other one or more buses configured to couple the components of computer 140.

Processor 301 is a microprocessor, embedded controller or logic sequencer enabled to provide control and/or management functions for computer 140. Examples of processor 301 include those manufactured by Microchip; a 32-bit CPU; a 64-bit CPU; an Advanced Micro Devices Inc. (AMD) CPU, such as an Opteron™ or Athlon™ CPU; an Intel CPU, such as a Peryn™, Xeon™ or Pentium™ or other x86 CPU; a SPARC™ microprocessor, such as those manufactured by Sun Microsystems Inc.; a PowerPC™ microprocessor, such as those manufactured by Motorola or IBM; and any other suitable processor or computing device. In some embodiments where computer 140 includes an ASIC or an FPGA, processor 301 includes a processor embedded in the ASIC or the FPGA, such as a MIPS, Advanced Reduced Instruction Set Computer (RISC) Machine (ARM), or another type of embedded processor.

According to various embodiments, processor 301 initializes one or more of: bus 302, network interface 330, image decoder 142, memory 310, display interface 320, and other components of computer 140. In an exemplary embodiment, processor 301 establishes a remote computing session with a host computer 110 in FIG. 1 which, following initialization, primarily comprises a media communication session between image encoder 116 in FIG. 1 and remote computer 140. Such a media communication session enables communication of encoded image data including initial quantized image updates, encoded progressive refinement data and motion vectors associated with previously communicated lossy and/or lossless image sections in addition to communication of management information, such as image build state, status updates, error reports, and the like. Once a media session is established, processor 301 is responsible for coordinating the various image decoding and display controller functions.

According to one or more embodiments, processor 301 is coupled to memory 310 which comprises random access memory, read only memory, removable disk memory, flash memory such as one or more of: electronic, magnetic, optical, and/or other types of storage media; volatile computer-readable media, such as RAM, DRAM, SRAM, DDR RAM or XDR RAM; and nonvolatile computer-readable media, such as ROM, hard drive, tape, CDROM, DVDROM, magneto-optical disks, EPROM, EEPROM, Flash EPROM or various combinations of these types of memory for storing data and/or computer-readable instructions. Memory 310 stores various software, firmware, and/or data structures. In various embodiments, memory 310 stores information, such as received image and progressive build state information, received motion vectors, decoded image information, and decoded raster image information in a format accessible to display interface 320.

In various embodiments, memory 310 is partitioned and/or distributed. For example, in some embodiments, memory 310 is partitioned into a plurality of partitions, such as system and frame buffer partitions, and the frame buffer partition is accessible by display interface 320. In other embodiments, functional entities such as processor 301, network interface 330, decoder 142 and/or other components of computer 140 include local memory resources, represented as memory 310 for clarity. In various embodiments, memory 310 uses different buses for coupling with network interface 330, processor 301, decoder 142, display interface 320, and support circuits 340. In further embodiments, memory 310 includes control logic for arbitrating access to memory 310 among the components of remote computer 140.

In various embodiments, display interface 320 accesses display information, such as decoded raster image information from memory 310 and/or image decoder 142, and provides a display signal, such as a raster signal, for a display using a display signaling protocol. In some DVI embodiments, display interface 320 includes line driver circuitry, such as Transition-Minimized Differential Signaling (TMDS) circuitry. In other embodiments, display interface 320 includes one or more VGA or DISPLAYPORT controllers and uses alternative display protocols, such as Display-Port, Digital Packet Video Link (DPVL), High-Definition Multimedia Interface (HDMI), or the like.

Network interface 330 provides compatibility with the network 130 (ref. FIG. 1) by executing communication protocols, such as UDP/IP, TCP/IP, session management, and security protocols. Network interface 330 receives an encoded image sequence from host computer 110 (ref. FIG. 1) for decoding and presentation.

Support circuits 340 include at least one of power supplies, clock circuits, data registers, I/O interfaces and the like. The support circuits 340 support the functionality of bus 302, decoder 142, memory 310, display interface 320, network interface 330, and other components of computer 140.

In various embodiments, image decoder 142 is one or more of: a programmable embedded digital media processor, such as a TMS320DM64x DaVinci™ digital media processor available from Texas Instruments; a PNX1300 Nexperia™ processor from NXP Semiconductors; a Field Programmable Gate Array (FPGA) or an Application Specific Integrated Circuit (ASIC) configured, at least in part, as a logic circuit to perform image decoding; and other processors and/or electronic hardware suitable for performing image decoding; software executing on and/or in conjunction with a processor such as processor 301, including any of the foregoing; and any combination of the foregoing.

Image decoder 142 is enabled to execute image decoding operations that convert an encoded image sequence received from host computer 110 to a decompressed display image 318 in a format, such as a raster image format, suitable for transmission using a communications medium, such as a VGA, DVI, or DISPLAYPORT cable, to one or more displays (ref. display 150 in FIG. 1) for presentation. In an embodiment, the encoded image stream is received on network interface 330 and stored in memory 310. The encoded image stream comprises transform domain progressive encodings 312 (e.g., progressive refinements in GREWP-encoded format) related to new or updated persistent image sections, a change mask 314 corresponding to change mask 126 in FIG. 1 identifying changed macro-blocks for which an initial refinement is anticipated (e.g., trailing area behind motion or final spatial location or initial refinement associated with re-encoding following motion), and motion vectors 316 related to image sections comprised of lossless or partially-refined pixels of decompressed display image 318 under motion (i.e., previously received pixels).

Entropy decoder 352 and progressive image decoder 354 operate in conjunction to decode progressive encodings 312. Entropy decoder 352 recovers quantized transform coefficients and/or refinement information associated with encoded display image sections, frames or regions by executing an inverse entropy transformation function that matches an entropy encoder function (e.g., the entropy encoder function of image encoder 116 in FIG. 1). According to various embodiments, the entropy decoder 352 comprises one or more of: a Golomb decoder, Rice decoder, Huffman decoder, variable length encoder (VLC), context-adaptive VLC or context-adaptive binary arithmetic decoder (CABAC), or other lossless data decompression decoders.

Progressive image decoder 354 decodes transform domain progressive encodings 312 using progressive decoding techniques, such as described in commonly assigned U.S. patent application Ser. No. 12/011,631 incorporated by reference herein in its entirety.

Motion compensation function 356 decodes each received motion vector from motion vectors 316 by copying the source set of pixels of decompressed display image 318 referenced by the motion vector (e.g., a 16×16 region of pixels) to a destination section of an updated version of decompressed display image 318 also referenced by the motion vector.

In some embodiments, various combinations of all or portions of functions performed by a computer (such as host computer 110, image encoder 116, image decoder 142, and remote computer 140 of FIG. 1), and portions of a processor, a microprocessor, or a programmable controller providing all or portions of the aforementioned functions, are specified by descriptions compatible with processing by a computer system (e.g., Verilog, Very High Speed Integrated Circuit Hardware Description Language (VHDL), or any similar hardware description language). In various embodiments, the processing includes any combination of interpretation, compilation, simulation, and synthesis to produce, to verify, or to specify logic and/or circuitry suitable for inclusion on an integrated circuit. The integrated circuit, according to various embodiments, is designed and/or manufactured according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

Figure 4:
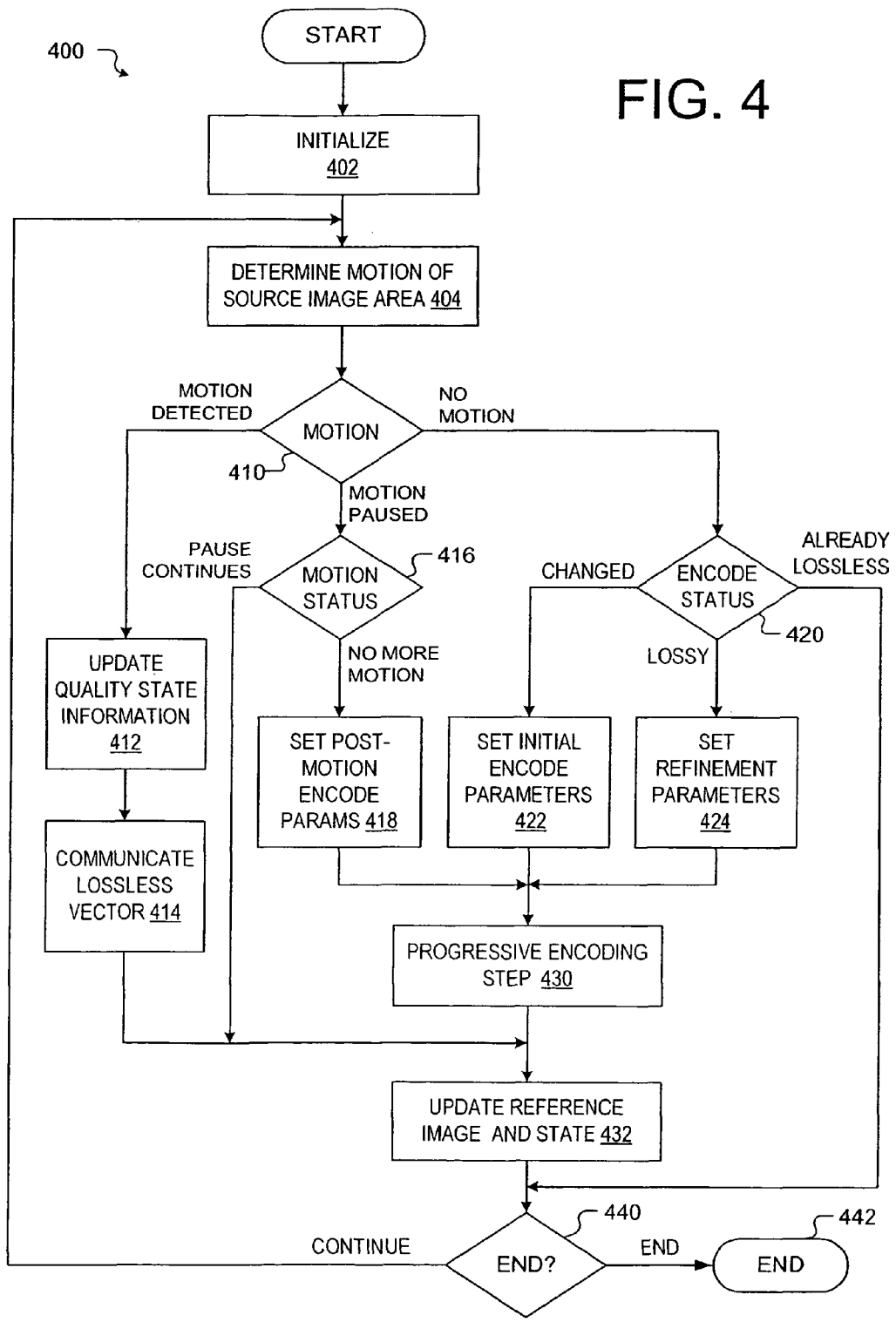
FIG. 4 is a flowchart illustrating a method for progressive encoding of a computer image under motion.

FIG. 4 illustrates an embodiment of a process 400 which is a method for progressive encoding sections of a source image, such as source image 120 in FIG. 1, in which pixels associated with one or more of the sections are under motion.

Process 400 starts and proceeds to step 402 ("Initialize"). In an embodiment, a host computer (ref. computer 110 in FIG. 1) and a remote computer (ref. computer 140 in FIG. 1) are initialized and a remote display session is established over a computer network (ref. network 130 in FIG. 1). Initialization of the host computer comprises initialization of data structures in host computer memory, including allocation of memory enabled to store one or more source images (ref. source image 120 in FIG. 1), initialization of the image encoder, encoder memory and data structures associated with progressive image encoding, allocation of memory enabled to store one or more reference images (ref. reference image 122 in FIG. 1), and initialization of a reference image and quality state information related to the encoding process (ref. state information 124 in FIG. 1). Initialization of the remote computer comprises initialization of the image decoder and data structures in remote computer memory, including decompressed display image 318 in FIG. 3.

Process 400 proceeds to step 404 ("Determine Motion of Source Image Area"), generally comprising identifying lossless (i.e., pixel-exact) motion for an area of the source image in relation to an area of the reference image. In an embodiment, a section of source image 120 in FIG. 1 is identified for processing, for example macro-blocks (e.g., 16×16 pixel blocks), comprising sections of 8×8 pixel blocks, may be processed from left to right and row by row from top to bottom of the source image 120. In an embodiment, all pixels of the identified section are copied from memory 114 (FIG. 1) to memory 118 (FIG. 1) in cases where any pixels of the identified section have changed, for example as determined by analysis of a dirty mask. In another embodiment, the identified section of source image 120 is extracted by the encoder from a digital video signal and change analysis is performed on the fly. In some embodiments, motion of the image section may be determined by identifying a new spatial location of the image area based on comparing image content from the source image and the reference image (i.e., comparing sequential image content from the image sequence) and making a determination that one or more otherwise unchanged portions has been spatially relocated (i.e., substantially similar visual image data comprising unchanged image content under motion is identified). In another embodiment, such a CPU-based encoder, the identified section of source image 120 in memory 114 is retrieved for analysis by CPU sub-system 112 (FIG. 1). In select cases wherein motion vectors are determined through an analysis of drawing commands, pixel data associated with the identified section need not be accessed for processing until pixel encoding or reference image update steps proceeding the motion search operation. Motion search comprises execution of any one or more of the lossless motion search techniques described in association with motion compensation encoder 220 (FIG. 2) to generate a motion vector, if possible for the identified section.

As a next step 410, process 400 proceeds to step 410 ("Motion") to determine subsequent action based on the availability of a motion vector and other state information. If no motion vector is available for the identified image section, as is the case when successive source image frames comprise visually persistent image content, and the image section is further identified as not in a pause state following recent motion (i.e., MOTION_VALID flag of Table 1 is clear), process 400 proceeds to step 420 where the progressive encoding status for the identified section is evaluated. If, at step 410, a motion vector is available, process 400 proceeds to step 412 ("Update Quality State Information"). If, at step 410, no motion vector is available for the identified section, and the section is further identified to be in a pause state following recent motion (i.e. MOTION_VALID flag of Table 1 is set), process 400 proceeds to step 416 ("Motion Status"), where motion status is re-evaluated.

Step 420 ("Encode Status") comprises an analysis of state information associated with the identified section in view of determining progressive encoding requirements. In various cases where image content (i.e., pixel values) of the section have changed, (i.e., CHANGE flag set), process 400 proceeds to step 422 ("Set Initial Encode Params."), wherein the initial encoding parameters, including quality level and encoding priority, for a progressive encoding sequence are set based on one or more of image type, bandwidth availability, the quality of surrounding sections, or the like. In an exemplary case, surrounding blocks of high quality justify a relatively high encoding priority for the identified section or related macro-block (as might occur when a cursor traverses a region, setting the CHANGE flag for a select set of sections), whereas surrounding blocks also comprising new pixels or low refinement levels justify a nominal encoding priority. In some embodiments, a change to image content of an image section subsequent to motion is determined, i.e., a change to a pixel value of a pixel associated with a new spatial location of the image section may be determined, where the change is exclusive of changes resulting from the motion. In such embodiments, an encoding of a second image section comprising the pixel may be communicated from the host computer to the remote computer.

In cases where the persistent image content in the image section is already partially refined (i.e., LOSSY flag set in a case where successive source image frames comprise visually persistent image content during successive encodings), process 400 proceeds to step 424, where the next incremental refinement level for the image section is determined based on encoding preferences similar to those defined for step 422.

Initial or incremental progressive encoding (i.e., refinement encoding) of the identified image section, the identified image section having visually persistent image content, is then performed in either case as step 430 ("Progressive encoding step") in view of the relative encoding priority, for example, as described for progressive image encoder 230 depicted in FIG. 2, following which process 400 proceeds to step 432 ("Update Reference Image and State"). If visually persistent image content for an image section is determined to be lossless (i.e., LOSSY flag cleared following a completed encoding sequence) at step 420, a lossless representation of the image section has already been communicated, in which case progressive encoding is skipped and process 400 proceeds to step 440 ("End?") and then to step 442 where process 400 ends.

Considering now the availability of a motion vector at step 410, the identified block transitions to a state of motion (i.e. MOTION_VALID flag of Table 1 is set). In various embodiments, process 400 proceeds to step 412 ("Update quality state information"). In select alternative embodiments, such as step 810 of process 800 discussed below in association with FIG. 8, an economics analysis evaluates the benefit conducting additional progressive encoding preceding motion compensation in order to reduce bandwidth consumption proceeding the motion.

Step 412 generally maintains quality information for an area of the reference image preceding motion, including mapping the motion of the area on successive source image frames so that the original quality information can be inherited by the relocated area of the source image proceeding the motion in order to minimize artifacts related to local spatial and/or temporal quality differentials. In an embodiment, step 412 tracks the quality level(s) of image sections under motion such that continued progressive refinement following motion (i.e., post-motion encoding at step 418) inherits a suitable initial quality level from the pre-motion refinement state. A representative quality level is determined for a partially refined image region (such as a visual window of a computer display image) at the time motion is detected, as might be the case when the visual window starts being dragged from one area of a computer display to another. In cases where different sections of the image region are at different refinement levels, the representative quality may comprise a set of quality values or may be based on an average refinement level, a weighted average according to the number of image sections at each refinement level, a minimum quality according to the least refined image section in the image region, or a suitable alternative representative quality metric. In an embodiment, step 412 maintains a database for the duration of the motion that tracks the representative quality of the source pixels by computing net motion vectors back to the original image area preceding the motion. After the motion, the quality of image sections comprising these pixels is determined from the attributes of the original image region. In some instances, sections at the edge of an image region under motion may be subject to just a few partially refined pixels, in which case a rebuild of the entire block may required following the period of motion. In other instances, for example if lossy status is managed at pixel resolution, the identified section may be brought to a lossless state by retransmission, residual encoding, a second refinement or additional refinements of the frequency transform, or the like, of lossy pixels. The second refinement encoding may comprise differences in pixel color values between the image portion and a combined decoding of the lossy encoding and the first refinement encoding. In other cases, residual encoding is achieved by communicating pixel differentials between source image macro-blocks and reference image macro-blocks.

In some embodiments, the initial quality level for the post-motion progressive encoding sequence is set according to defined encoding preferences, as described for step 422, rather than inherited quality levels. Given that block boundaries are typically violated once motion has commenced, progressive refinement state information may be discarded for macro-blocks comprising any partially refined blocks under motion. If quality tracking techniques are not maintained for later re-encoding, step 412 may be bypassed and process 400 can proceed from step 410 to step 414 on the availability of subsequent consecutive motion vectors.

As a next step 414 ("Communicate Lossless Vector"), a lossless motion vector is communicated for the identified image section, identifying the area of the reference image where the source pixels are located. In an embodiment, the communicated motion vector comprises substantially all of an encoding of the image portion necessary to display an updated visual representation of the image portion at the remote computer.

Considering now the absence of a motion vector at step 410 following previous motion (i.e., motion paused), process 400 proceeds to step 416 ("Motion Status"). In some embodiments, a frame counter is used to determine when no more motion is present. On a first pass through step 416, a counter (e.g., PAUSE_DURATION of Table 1) is loaded with a defined frame count specifying a number of stable consecutive frames (i.e., CHANGE flag clear and motion free) required before the identified section transitions to a state of no motion, and process 400 proceeds to step 432 ("Update reference image and state"). On subsequent passes, the counter is decremented, and, until the counter reaches zero, process 400 continues the motion pause state by proceeding to step 432. Once the counter reaches zero, the MOTION_VALID flag is cleared (i.e., "no more motion") and process 400 proceeds from step 416 to step 418 ("Set post-motion encode params."), where the initial quality level for a progressive rebuild (e.g., as maintained at step 412) is retrieved and encoding priority set preceding an initial progressive encoding step 430. In an embodiment, the encoding priority is set according to a regional determination as described for step 422. In other embodiments, the duration of the pause is associated with the timing of packet communications of the host computer. In some such embodiments, the MOTION_VALID flag is cleared when the pause state is again confirmed as true following the completed communication of the previous frame update or following a delay synchronized to communications of the previous frame update.

Process 400 proceeds to step 432 ("Update Reference Image and State") following motion search (i.e., "pause continues" at step 416) or following progressive encoding at step 430. In an embodiment, step 432 comprises updating the identified section in the reference image 122 (FIG. 1) if these pixels in the source image have changed. Step 432 further comprises updating state information 124 to reflect progressive refinement state updates, including update of the LOSSY flag to reflect a lossless section status when progressive encoding has completed.

Process 400 proceeds to step 440 ("End?") where it is determined if encoding shall continue, in which case a next section in the source image is captured at step 404 or process 400 ends at step 442, for example at the termination of a remote display session.

In an embodiment of process 400, various rendering periods for source image 120 in FIG. 1 are reviewed to determine timing associated with the encoding process. An image portion comprising changed image content (for initial lossy encoding) is detected during a first rendering period. A second rendering period determines the persistence and a constant spatial location for the image portion (for generating the first refinement encoding), and a third rendering period determines persistence of the image portion and a new spatial location of the image portion (for determining the motion vector). In various embodiments, reviewing the rendering periods comprises analyzing a sequence of rendering operations used to render the image sequence or analyzing an image frame sequence. Each of the first, the second, and the third periods may comprise a defined period of time or a period of time necessary to communicate one or more previous encodings of the image sequence.

FIG. 5 illustrates a series of frame updates 500 for a representative image section through a transition between progressive refinement and motion states.

FIG. 5A shows arbitrary first state 501 for image area 502 of a source image frame, each image section of the image area 502 comprising a block of 8×8 pixels. For illustrative purposes, and without loss of generality, state 501 shows image area 502 in a partially refined state with three image sections of top row 505 at a refinement quality level of 3, three image sections of a middle row 506, including identified image section 504, at an initial refinement quality level of 1, and three image sections of a bottom row at a refinement quality level of 2.

FIG. 5B shows next state 510 for image area 502 of a subsequent source image frame which is visually persistent from state 501 (i.e., no motion vectors determined and no changed image sections of the source image such that each of the image sections is processed according to steps 404, 410, 420, 424, 430 and 432 in process 400 of FIG. 4). The three image sections of row 505 have progressed to a refinement quality level of 4, the three image sections of row 506, including identified image section 504, have progressed to a refinement quality level of 2, and the three image sections of row 507 have progressed to a refinement quality level of 3.

FIG. 5C shows next state 520 for image area 502 of a subsequent source image frame which remains visually persistent. The three image sections of row 505 have progressed to a lossless refinement quality level $Q_{LL}$, the three image sections of row 506, including identified image section 504, have progressed to a refinement quality level of 3, and the three image sections of row 507 have progressed to a refinement quality level of 4.

FIG. 5D shows next state 530 for image area 502 of a subsequent source image frame in which a motion vector is determined for identified image section 504, now comprising pixels from four image sections in reference image 532. Section 504 is processed according to steps 404, 410, 412, 414 and 432 in process 400 of FIG. 4 such that a motion vector identifies the lossy pixels in reference image 532 (from rows 506 and 507 in the reference image 532).

FIG. 5E shows next state 540 for image area 502 of a subsequent source image frame in which there is no longer motion. Image section 504 is processed according to steps 404, 410, 416, 418, 430, and 432 in process 400 of FIG. 4, such that an initial refinement level $Q_B$ is encoded. In various embodiments, quality level $Q_B$ is a representative quality level associated with state 520 prior to motion detection (as determined in step 412 of FIG. 4).

Finally, FIG. 5F shows next state 550 for image area 502 of a subsequent source image frame which remains visually persistent compared to state 540. Image section 504 in state 550 is at a lossless refinement quality level $Q_{LL}$.

FIG. 6 illustrates a series of frame updates 600 for an identified image section before and after motion that inherits an initial quality following the motion from the representative quality of a defined image region before the motion.

FIG. 6A shows first state 601 preceding motion for image area 602 of a source frame, each section comprising a block of 8×8 pixels. For illustrative purposes, and without loss of generality, state 601 shows image area 602, comprising image sections in the intersection of rows 604, 605, 606, 607, and 608 with columns 614, 615, 616, 617, and 618, in a partially refined state. For purposes of example, the bulk of image area 602 is at quality level $Q_b$, with the exception of image area 622 at lower quality state $Q_a$. A lower quality image area may result from various rendering scenarios, for example, in cases when a cursor moves through image area 622 of the image area 602 at a time when the each section of image area 602 is at same quality level (i.e., quality level $Q_b$ in the depicted scenario) part way through a progressive encoding process. In the exemplary case of a moving cursor, the image content changed as a result of the cursor movement in image area 622 is encoded to an initial encoding of quality state $Q_a$, resulting in different image sections of image area 602 comprising different quality levels prior to motion. When motion is detected, a representative quality for the image region is determined, such as $Q_a$ itself, $Q_b$ itself, or a weighted average quality based on the number of image sections at each quality level.

FIG. 6B shows next state 610 for image area 602 of a subsequent source image frame in which a motion vector is determined for identified image section 620, which now comprises pixels from various image sections in reference image 626. Image section 620 is processed according to steps 404, 410, 412, 414, and 432 in process 400 of FIG. 4. In one embodiment, image section 620 inherits the representative quality determined from image state 601 as described. In another embodiment, image section 620 inherits quality level $Q_b$ in view of the fact that all pixels now in image section 620 are at quality level $Q_b$ in reference image 626.

FIG. 7 illustrates a series of frame updates 700 for an image area before and after motion in which identified image sections are re-encoded at a higher priority following motion based on an analysis of the post-motion quality of the image area.

FIG. 7A shows first state 701 preceding motion for image area 702 of a source image frame, each image section comprising a block of 8×8 pixels. For illustrative purposes, and without loss of generality, state 701 shows image area 702, comprising image sections in the intersection of rows 704, 705, 706, 707, and 708 with columns 714, 715, 716, 717, and 718, in a partially refined state. As with the example image area 602 of FIG. 6, the bulk of image area 702 is at quality level $Q_b$ with the exception of image area 720 at lower quality state $Q_a$.

FIG. 7B shows next state 710 for image area 702 of a subsequent source image frame in which motion vectors are determined for image sections in the intersection of rows 704, 705, 706, and 707 with columns 715, 716, 717, and 718. The sections in image area 724 each comprise at least one pixel at quality level $Q_a$ in reference image 722. Consequently, following the motion, the encoding of image sections in image area 724 is prioritized over the encoding of other image sections of image area 702 (ref. step 418 in FIG. 4). In some embodiments, the post-motion encoding comprises prioritizing an encoding of a subset of pixels within an image section or sections based on an accumulated image quality of a decoding of communicated data of the image section or sections, as well as a duration of a persistence of the image section or sections at a new spatial location within the image.

Figure 8:
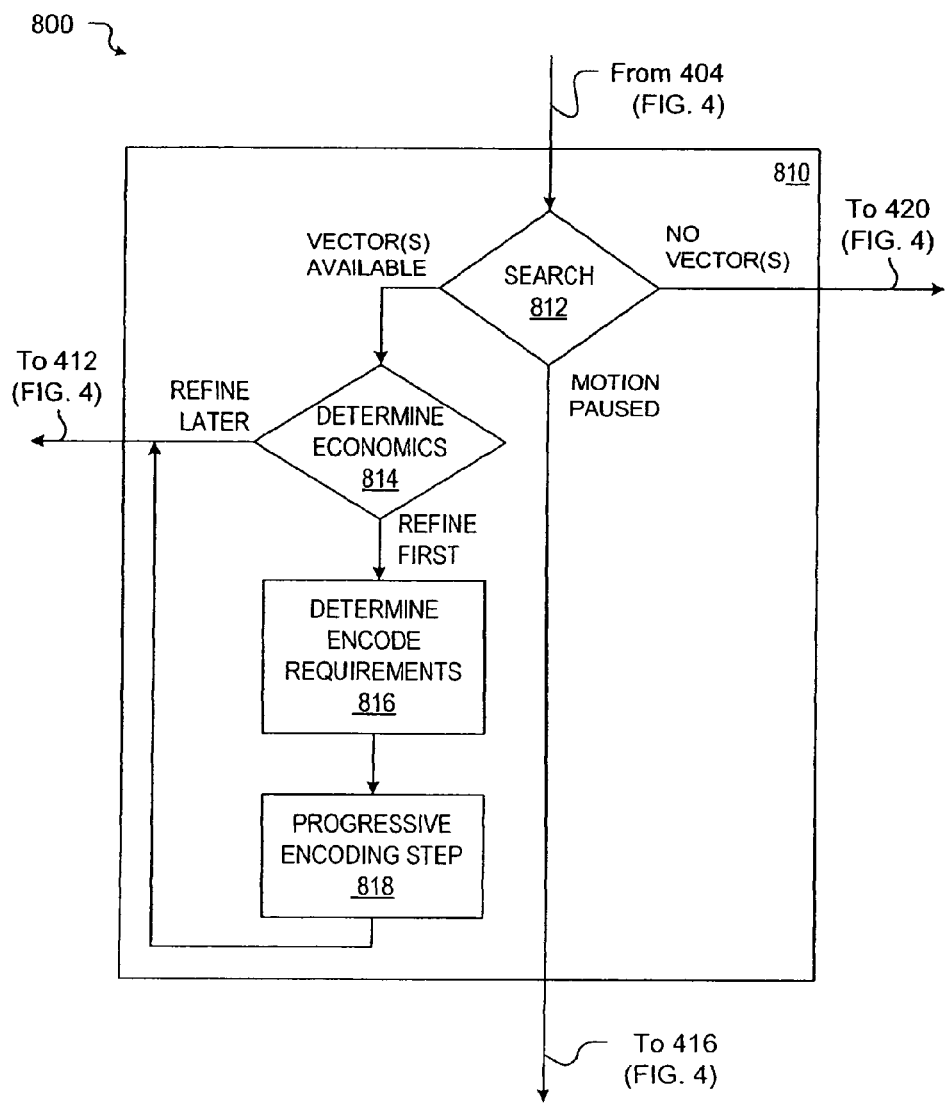
FIG. 8 illustrates a process for evaluating continued progressive encoding or lossless motion compensation based on resource usage economics.

FIG. 8 shows process 800 comprising step 810 for evaluating continued progressive encoding or lossless motion compensation based on resource usage economics. Step 810 is an exemplary implementation of step 410 in FIG. 4.

Process 800 commences with step 812 ("Search"), where a motion vector is sought for the identified image section as described in process 400 of FIG. 4. If no motion vectors are found and MOTION_VALID flag of Table 1 is clear, process 800 proceeds to step 420 in FIG. 4. If the MOTION_VALID flag is set but no motion vectors are found, process 800 proceeds to step 416 of FIG. 4. If a motion vector is identified, process 800 proceeds to step 814 ("Determine Economics"), where a criteria for performing a refinement encoding of at least a portion of the image section, such as the benefits of additional progressive refinement ahead of motion compensation, is evaluated in light of considerations, such as immediate bandwidth availability, latency requirements, or the quality level of surrounding pixels.

In many cases, for example if the image region under motion has a homogeneous refinement level or if a large proportion of the image region is at a relatively low visual quality, continued progressive refinement is stopped until motion ends, in which case process 800 proceeds to step 412 in process 400 of FIG. 4.

In select cases, a continued progressive refinement step or sequence is prioritized ahead of motion compensation either by inserting one or more progressive refinement frames ahead of a motion vector (i.e., the additional refinement encodings are to be decoded at the remote computer prior to decoding the motion vector at the remote computer) or by using a 'refine and copy' command in the encoded image sequence in conjunction with comparable decoder data structures that maintain encoding state information until motion compensation is confirmed. If additional refinement precedes motion compensation, process 800 proceeds to step 816 ("Determine Encode Requirements"), where encoding priority and next quality level for the progressive refinement sequence is determined, followed by a progressive encoding step 818 ("Progressive Encoding Step"). In one exemplary case, an identified partially refined image section at a visually poor quality level, the partially refined image section within a relatively large image region otherwise comprising lossless, perceptually lossless, or other of a visually acceptable quality level, is improved prior to motion compensation. Such improvement may be performed to reduce the amount of compressed data associated with image rebuilding following the motion or to minimize visual artifacts related to adjacent image regions of different quality levels. Examples of such cases include an image section comprising a blinking cursor in an otherwise visually persistent display region, or a small animation object within a large image region under motion, such as a scrolling webpage. In another exemplary case, an image section at a visually poor quality level (i.e., low level of refinement) is incremented to a minimum acceptable visual quality level preceding motion compensation, for example, based on the quality level of adjacent areas at the destination. In yet another case, such as an identified image section comprising video type pixels at a low quality, the progressive refinement state of the image section is set to a lossless state preceding motion compensation without communicating refinement data (ref. step 430 in FIG. 4), thereby negating a need to rebuild contaminated image sections proceeding the motion. Following the progressive encoding step 818 (i.e., communicating the additional refinement encoding from the host computer to the remote computer), process 800 proceeds to step 412 of process 400 in FIG. 4.

In some cases, process 800 proceeds from step 814 to 412 in FIG. 4 based on near-term bandwidth constraints, as might be the case if other regions of the image are changing. In other cases, process 800 proceeds from step 814 to 412 in FIG. 4 based on latency considerations or based on the type of image under motion. In other embodiments, an additional refinement encoding (i.e., of an image section or a subset of the image section) generated by process 800 may be communicated to the remote computer in conjunction with communicating the motion vector; in such embodiments, the additional refinement encoding may or may not be decoded at the remote computer prior to decoding the motion vector at the remote computer.

FIG. 9 illustrates a series of frame updates for a representative image section through a transition between progressive refinement and motion states in which at least one image section comprises a progressive refinement prior to motion compensation.

FIG. 9A shows first state 901 preceding motion for image area 902 of a source image frame, each image section of image area 902 comprising a block of 8×8 pixels. For illustrative purposes, and without loss of generality, state 901 shows image area 902 comprising image sections in the intersection of rows 904, 905, 906, 907, and 908 with columns 914, 915, 916, 917, and 918 in a partially refined state. As with the example image area 602 of FIG. 6, the bulk of image area 902 is at quality level $Q_b$ with the exception of image area 922 at lower quality state $Q_a$.

FIG. 9B shows next state 910 for image area 902 of a subsequent source image frame for which motion vectors are available for one or more image sections. A cost-benefit trade-off is performed (ref. step 814 in FIG. 8) and image area 924 is incremented to quality level $Q_b$ preceding motion compensation.

FIG. 9C shows next state 920 for image area 902 of a subsequent source image frame in which motion vectors in reference image 932 are again available for image region 934. Motion compensation is performed (ref. steps 412 and 414 in FIG. 4), this time without any contamination associated with lower quality sections (ref. region 724 in FIG. 7), thereby negating a need to prioritize updates for an enlarged image region.

While the foregoing is directed to embodiments of the present invention, other and further embodiments of the invention may be devised without departing from the basic scope thereof, and the scope thereof is determined by the claims that follow.

The invention claimed is:

1. A method of communicating an image sequence rendered by a host computer, the method comprising:
   determining, by the host computer and after performing a progressive encoding of a constant image at a constant spatial location in the image sequence, a lossless motion of the constant image in the image sequence, wherein the progressive encoding comprises generating, in absence of a lossless match of the constant image to a previous image, a lossy encoded state of the constant image comprising a lossy encoding of a frequency transform of the constant image and a first refinement encoding of the frequency transform, wherein determining the lossless motion comprises detecting the constant image at a new spatial location in the image sequence, wherein the constant image comprises exact pixel value matches between frames of a period of the constant image;
   generating, by the host computer, a lossless motion vector as an encoding of the lossless motion;
   communicating, from the host computer to a remote computer, the lossy encoding, the first refinement encoding, and the lossless motion vector;
   determining, subsequent to communicating the lossless motion vector, persistence of the constant image at the new spatial location; and communicating, to the remote computer, a lossless re-encoding of the constant image at the new spatial location in response to the persistence and the lossy encoded state.

2. The method of claim 1, wherein the constant image at the constant spatial location and the constant image at the new spatial location comprise identical visual image data.

3. The method of claim 2, wherein determining the lossless motion of the constant image comprises identifying, subsequent to generating the lossy encoding, the new spatial location based on comparing sequential image frames of the image sequence.

4. The method of claim 1, wherein the lossless motion vector identifies to a decoder a perfect pixel value match between the constant image at the new spatial location and the constant image at the constant spatial location.

5. The method of claim 1, wherein communicating the lossless re-encoding comprises prioritizing an encoding of a subset of pixels within the constant image based on an accumulated image quality of a decoding of communicated data of the constant image and a duration of the persistence.

6. The method of claim 1, further comprising communicating, from the host computer to the remote computer, subsequent to determining the lossless motion, at least one additional refinement encoding of the frequency transform, the at least one additional refinement encoding to be decoded at the remote computer prior to decoding the lossless motion vector at the remote computer.

7. The method of claim 1 further comprising maintaining first and second quality state information for a first and a second spatial section, respectively, of a frame buffer associated with the image sequence, wherein (i) the first spatial section comprises a first pixel of the constant image prior to the determining the lossless motion, (ii) the second spatial section comprises a second pixel of the constant image at the new spatial location associated with the first pixel subsequent to the lossless motion, and (iii) the second quality state information, subsequent to the lossless motion, comprises a portion of the first quality state information prior to the lossless motion.

8. The method of claim 7 wherein, subsequent to the lossless motion, the second quality state information comprises transmitted encoded quality levels and an image source spatial location for the first pixel prior to the lossless motion.

9. The method of claim 1 further comprising:
determining, by the host computer, a change to a pixel value of a pixel associated with the new spatial location subsequent to the lossless motion, the change exclusive of changes resulting from the lossless motion; and
communicating, from the host computer to the remote computer, an encoding of a second image portion of the image sequence, wherein the second image portion comprises the pixel.

10. The method of claim 1 further comprising reviewing, by the host computer, a first, a second, and a third period of rendering of the image sequence for determining (i) changed image content, resulting in the constant image, for generating the lossy encoding, (ii) persistence of the constant image and the constant spatial location of the constant image within the image sequence for generating the first refinement encoding, and (iii) persistence of the constant image and the new spatial location of the constant image within the image sequence for determining the lossless motion, respectively.

11. The method of claim 10, wherein reviewing the first, the second, and the third period comprises at least one of analyzing a respective sequence of rendering operations used to render the image sequence or analyzing a respective image frame sequence of the image sequence.

12. The method claim of 10, wherein each of the first, the second, and the third periods comprises at least one of a defined period of time or at least a period of time necessary to communicate a respective previous encoding of the image sequence.

13. The method of claim 1, wherein the image sequence comprises a sequence of images in a format for display by a computer display.

14. The method of claim 1, further comprising:
evaluating, by the host computer, subsequent to determining the lossless motion and prior to communicating the lossless motion vector, a criteria for performing a refinement encoding of at least a subset of the constant image; and
performing, based on the evaluating, one of (i) communicating, from the host computer to the remote computer, a refinement encoding of a frequency transform of the at least a subset of the constant image prior to communicating the lossless motion vector, (ii) communicating, from the host computer to the remote computer, the refinement encoding in conjunction with communicating the lossless motion vector, or (iii) communicating the lossless motion vector.

15. A method of communicating a computer rendered image sequence from a host computer to a remote computer, comprising:
(a) determining, by the host computer, a portion, of constant shape and lossless persistent image content, of a period of the computer rendered image sequence, wherein at least one lossless movement of the portion occurs between image frames of the period, wherein determining the at least one lossless movement comprises detecting a lossless copy of the portion at a new spatial location of a subsequent frame in the computer rendered image sequence, wherein the portion comprises exact pixel value matches between frames of the computer rendered image sequence during the period;
(b) communicating, from the host computer to the remote computer, during the period, a lossy encoding of the portion and at least one progressive refinement of the portion, prior to the at least one lossless movement, wherein the lossy encoding and the at least one progressive refinement comprise respective initial and subsequent layers of a frequency transformation of the portion;
(c) determining, by the host computer, during the period, one of (i) a stationary location of the portion for a plurality of frames or (ii) a lossless movement of the portion;
(d) generating, by the host computer, compressed data comprising one of (i) a refinement of the portion in response to determining the stationary location and to determining an incomplete refinement of an encoding of the portion, the incomplete refinement determined from an encoded state record of the portion, or (ii) at least one lossless motion vector indicating the lossless movement in response to determining the lossless movement;
(e) communicating, from the host computer to the remote computer, one of (i) first compressed data comprising refinements of the portion in response to determining the stationary location, or (ii) second compressed data comprising at least one lossless motion vector representing the lossless movement in response to determining the lossless movement; and (f) repeating steps (c)-(e) while the period persists and until communicating the first compressed data after determining the lossless movement.

16. An encoder system at a host computer for encoding a computer rendered image sequence, the encoder system comprising:
- a progressive image encoder enabled to (i) generate encoded refinements of a frequency transform of a section of the computer rendered image sequence while detecting the section remains pixel value constant and spatially static, and (ii) communicate the encoded refinements to a remote computer, wherein the remote computer is enabled for coupling to the host computer by a packet switched network;
- a motion compensation encoder enabled to (i) detect lossless motion, and generate lossless motion vectors, for the section during a lossless motion period wherein the section remains pixel value constant and spatially moving, wherein the motion compensation encoder determines that the section remains pixel value constant and spatially moving by detecting a lossless copy of the section at a new spatial location of a new frame in the computer rendered image, and (ii) communicate the lossless motion vectors to the remote computer; and
- a storage for storing encoding information for the section, wherein the progressive image encoder is further enabled to generate an additional encoding of the section, decodable to generate a lossless decoding of the section and subsequent to the lossless motion period followed by a period of frames of the computer rendered image sequence where the section remains pixel value constant.

17. The encoder system of claim 16, wherein the additional encoding comprises at least one of a residual encoding, an initial encoding, or an encoding of additional frequency transform refinements.

18. The encoder system of claim 16, wherein the progressive image encoder is further enabled to (i) generate decoded pixel values by decoding a combination of the encoded refinements and the lossless motion vectors, (ii) generate an encoded difference between decoded pixel values and source pixel values of the section, and (iii) communicate the encoded difference to the remote computer.

19. The method of claim 1, further comprising starting a new progressive encoding of a second portion of the image sequence based on an absence of a previously encoded lossless copy of the second portion, wherein the lossless re-encoding is a lossless encoding of the constant image at the new spatial location.

* * * * *